United States Patent [19]

Sawano et al.

[11] Patent Number: 5,416,561
[45] Date of Patent: May 16, 1995

[54] IMAGE EXPOSURE APPARATUS AND IMAGE EXPOSURE METHOD

[75] Inventors: Mitsuru Sawano; Mitsuyoshi Ichihashi; Koichi Kimura; Kenichi Nakagawa, all of Shizuoka; Nobuo Matsumoto, Kanagawa, all of Japan

[73] Assignee: Fuji Photo Film Co., Ltd., Kanagawa, Japan

[21] Appl. No.: 204,446

[22] Filed: Mar. 2, 1994

[30] Foreign Application Priority Data

Mar. 3, 1993 [JP] Japan .................................. 5-065932
Jun. 7, 1993 [JP] Japan .................................. 5-160029

[51] Int. Cl.$^6$ ...................... G03B 27/52; G03B 27/70
[52] U.S. Cl. ........................................ 355/43; 355/66; 358/471
[58] Field of Search .................. 355/43, 60, 65, 66; 358/471

[56] References Cited

U.S. PATENT DOCUMENTS

| | | | |
|---|---|---|---|
| 3,934,081 | 1/1976 | Schumacher | 178/6.8 |
| 4,422,753 | 12/1983 | Pryor | 355/43 |
| 4,860,061 | 8/1989 | Ikeda | 355/43 |
| 5,235,437 | 8/1993 | Katagiri et al. | 358/471 |

OTHER PUBLICATIONS

Japan Society for the Promotion of Science, "Handbook of Liquid Crystal Devices," Beam Address System, pp. 434–436 (1989); Takizawa, Kikuchi and Fujikake.

"Spatial Light Modulator Using a Light Scattering Liquid Crystal Complex", NHK Giken R & D, No. 12, pp. 11–12 (1992).

Okano and Kobayashi, "Liquid Crystal, Application," chap. 10, Photoconductive Liquid Crystal Display, pp. 223–228 (1985).

Primary Examiner—Richard A. Wintercorn
Attorney, Agent, or Firm—Sughrue, Mion, Zinn, Macpeak & Seas

[57] ABSTRACT

An image exposure apparatus and method generates a first optical image light and a second optical image light. The first optical image is input to a read side of a spatial light modulating element, and the second optical image light is input to a write side of the spatial light modulating element, so that the first optical image light is modulated by the second image light to be output from the read side again; and exposing the light sensitive material to the output image from the read side, that is the both images are combined, or the intensity of both image lights are modulated.

7 Claims, 3 Drawing Sheets

IMAGE EXPOSURE APPARATUS AND IMAGE EXPOSURE METHOD

BACKGROUND OF THE INVENTION

The present invention relates to exposure to an image of a photographic film, and particularly relates to an image exposure apparatus and an image exposure method in which a photosensitive material is exposed to add any photographic effects to an image of a photographic film. For example, as the photographic effects, the contrast of an image is corrected or controlled, and photographic paper is exposed to the corrected or controlled image light. Further there is a photographic effect in which a photosensitive material is exposed to a combination of an image of a photographic film and another image.

Recently, when image exposure is conducted in a photographic printer, it is often to expose photographic paper to a combination of an image light of a negative film and another image light such as a frame, a graphic, or characters.

In the prior art, this exposure is conducted while inserting a pattern mask such as a lith film into an optical path, writing image information which is to be combined, to photographic paper by a laser, or inserting a liquid crystal mask into an optical path.

Such exposure has problems as follows: In exposure using a pattern mask, the pattern mask must be inserted in the vicinity of photographic paper. As a result, the operations of inserting and detaching the pattern mask must be conducted in a dark room.

In exposure using a laser, due to scanning exposure a considerably long exposure time is required and the structure of movable parts for conducting the scanning is complicated.

In exposure using a liquid crystal mask, pixels constituting the liquid crystal mask are arranged in a matrix. Particularly when exposure to a curved image is conducted, therefore, there arises a problem in that the resulting image fails to form smooth lines and has low definition.

Alternately, the contrast characteristic afore-said of an image recorded on a photographic film depends on the conditions at thus recording. Black-and-white photographic paper or color photographic paper is exposed to the image light having the contrast.

With respect to black-and-white photographic paper, a wide variety of kinds which have different tones ranging from high contrast to low contrast are available. When a black-and-white image is to be printed, photographic paper having a tone which is suitable for the contrast of an image of a photographic film or the intention of the photographer is selected.

With respect to color photographic paper, unlike black-and-white photographic paper, a wide variety of kinds which have different tones are not available, and only one kind having a certain tone is available. When a color image is to be printed, therefore, a contrast conversion is performed so that an image of a photographic film is expressed under the density latitude which can be expressed by the color photographic paper, thereby obtaining a printed image of low or high contrast.

When an image of a photographic film is to be printed while its tone is changed to a lower level, exposure is conducted while inserting a mask in which the brightness pattern is the inversion of that of the negative image, into an optical path. In contrast, when the image of the photographic film is to be printed while its tone is changed to a higher level, exposure is conducted while inserting a mask in which the brightness pattern is the same as that of the negative image, into the optical path.

In an example of a known contrast correction method which does not use such a mask, a liquid crystal panel where electrodes are arranged in a matrix form is used, and the transmittance of each pixel is controlled so as to obtain a desired amount of light. According to this method, the contrast of an image which is to be printed can be corrected by controlling the voltage applied to the electrodes.

When an image is to be printed to black-and-white photographic paper, as described above, various kinds of photographic paper having different tones may be available. However, photographic paper of a desired tone is not always available.

When an image is to be printed to color photographic paper, considerable time and labor are required to determine an appropriate mask and insert the mask into an optical path, thereby requiring a great amount of skill.

In the case where an image is to be printed to color photographic paper with using the above-mentioned liquid crystal panel in place of a mask, the voltage to be applied must be controlled for every region. A configuration of the circuit is complicated.

In a color image exposure apparatus of the level which is usually obtainable in the market, therefore, it is difficult to attain a simple exposing process in which the contrast of an image is corrected.

SUMMARY OF THE INVENTION

The invention has been conducted in view of the above-mentioned circumstances. It is an object of the invention to provide an image exposure apparatus and an image exposure method in which an image Of a negative film can easily be combined with another image such as that of a pattern mask and it is possible to expose photographic paper to a high definition image.

Further there is another object to provide an image exposure apparatus which can easily correct the contrast of an image of a photographic film.

In order to accomplish the above objects, the invention is to provide a method and an apparatus for exposing a light sensitive material, in which a first optical image light is input to a read side of a spatial light modulating element, a second optical image light is input to a write side of the spatial light modulating element, so that the first optical image light is modulated by the second image light to be output from the read side again, wherein said light sensitive material is exposed to said output image light from the read side.

Further, means for generating the first image and means for generating the second image generating have the same light source, the first and second images being split from one original image from the light source by means of a half mirror, whereby the spatial light modulation means modulate intensity of the first image light entering through the read side in accordance with intensity of the second image light entering through the write side.

Furthermore, the apparatus of the invention is provided with a driving means for supplying a predetermined voltage to the transparent electrodes to change orientation of the liquid crystal material, a detecting means for detecting a density of the output image from the read side. And then a control means controls the driving means in accordance with the density of the output image so as to adjust a contrast range of the output image into a latitude of the light sensitive material.

According to the image exposure apparatus and method of the invention, image information generated by the first image information generation means is introduced from the read side of the spatial light modulation means, and then modulated with image information generated by the second image information generation means. The modulated image information is then output.

On the other hand, in another example, the image entering through the read side of the spatial light modulation means is same as the image entering through the write side of the spatial light modulation means. Therefore, the intensity of light entering through the read side is modulated in accordance with the intensity of image light entering through the write side. Namely, since the image light has a density distribution corresponding to the original image, the intensity of the output(-modulated) light from the read side corresponds to the density distribution.

Furthermore, the intensity of the output image from the read side is also modulated in accordance with a supply voltage to the spatial light modulation means, the supply voltage is controlled in accordance with the density of the output image so as to adjust a contrast range of the output image into a latitude of the light sensitive material.

A spatial light modulator (hereinafter, abbreviated as "SLM") functioning as the spatial light modulation means has a basic structure which includes address side material, modulation material, and mirror separating therebetween, e.g. a configuration consisting of a photoconductive film, a light shielding film, a dielectric mirror, and a liquid crystal in which liquid crystal molecules are aligned in a predetermined degree by orientation films are arranged in this sequence and provided between a pair of glass substrates on which transparent electrodes are respectively formed so as to oppose to each other (Japan Society for the Promotion of Science, "Handbook of liquid crystal devices," Beam address system, pp. 434–436 (1989); Takizawa, Kikuchi and Fujikake, "Spatial light modulator using a light scattering liquid crystal complex," NHK Giken R & D, No. 12, pp. 11–12 (1992); and Okano and Kobayashi, "Liquid crystal, Application," chap. 10, Photoconductive liquid crystal display, pp. 223–228 (1985)).

When image light is introduced into the photoconductive film constituting the SLM, the impedance of the photoconductive film is lowered, and as a result an electric field is generated in a range of the portion of the liquid crystal corresponding to the introduced image light. This causes an electrooptic effect to be produced in the liquid crystal passing through the mirror, that is the SLM modulates the image light introduced from the write side and reflects the image light at the mirror to output the modulated image light. The output image light is the one which is a combination of the image information sets respectively generated by the first and second image light generating means. The output image light is supplied to exposure means which in turn conducts exposure to a combined image.

Thus the first image light generating means irradiates an original image such as an image of a photographic film, thereby obtaining image light. The second image light generating means irradiates a pattern mask on which a desired image pattern to be combined with the original image is formed, or an image of a photographic film, thereby obtaining a required image. Alternatively, the second image light generating means may be the one which operates light emitting means such as an EL (electroluminescence) display device or a CRT (cathode ray tube) on which a desired image is displayed, so as to emit light, thereby obtaining required image.

Further, the output image light from the read side corresponds to the intensity of light entering through the write side. The control means determines a preferred exposing amount to control the intensity of the modulated image light and irradiating period to the photo-sensitive material so as to adjust a contrast range of the output image into a latitude of the light sensitive material. The intensity of the modulated image light is controlled by the driving voltage to be applied to the SLM, and the irradiating period is controlled by the supplying period of the driving voltage.

The liquid crystal provided in the SLM may be selected from a TN (twisted nematic) liquid crystal, a GH (guest host) liquid crystal, a surface stabilized ferroelectric liquid crystal, and a polymer dispersion liquid crystal.

The TN liquid crystal has the following configuration: A composition wherein a trace of a chiral material for suppressing generation of reversely twisted domains is added to a multicomponent nematic liquid crystal in which molecules twisted by 45 deg. are aligned. and which has a positive anisotropy of dielectric constant is provided between transparent electrodes that underwent an orientation process and are respectively formed on a pair of glass substrates so as to oppose to each other. A polarizing plate is disposed on the outer face of each of the glass substrates.

In the SLM in which the TN liquid crystal is provided, when light from the write side enters the photoconductive film, the impedance of the photoconductive film is lowered. Therefore, an electric field is applied to the liquid crystal portion corresponding to the impedance-lowered portion, so that the alignment manner of the liquid crystal molecules is changed. Light from the read side is modulated by the liquid crystal and the polarizing angles at transmission of the polarizing plates become optically parallel, whereby the light is allowed to pass through the polarizing plates.

On the other hand, when image light from the write side enters the photoconductive film, the same image light from the read side passes through the polarizing plate disposed in the light output side, to enter the SLM, and the direction of deflection is optically changed, whereby the intensity of emitted light which has passed through the polarizing plate for the light emitting side can be modulated.

The phenomenon that direction of deflection becomes parallel with the direction of polarization of entering light occurs in the case where the intensity of light entering the write side is high, or light which has passed through a lower-density portion of the negative image is written into the SLM. In this case, if the polarizing plate for the light emitting side is orthogonally disposed, the intensity of light to which the photographic paper is exposed is decreased, resulting in that the contrast of the image is suppressed.

In contrast, if the polarizing plate for the light emitting side is disposed in parallel, the intensity of emitted light becomes high when the intensity of light entering the write side is high. Therefore, also the intensity of light to which the photographic paper is exposed is increased, resulting in that the contrast is emphasized.

The GH liquid crystal is configured so that a liquid crystal in which a dichroic dye is dissolved in a multi-component nematic liquid crystal in which molecules are aligned twistedly and which has a positive anisotropy of dielectric constant is provided between transparent electrodes that underwent an orientation process and are respectively formed on a pair of glass substrates so as to oppose to each other. Molecules of the dichroic dye are aligned in parallel with those of the nematic liquid crystal. When the alignment of the liquid crystal molecules is changed by applying an electric field, therefore, also the alignment of the dichroic dye molecules is changed. The optical absorption characteristic of the dichroic dye in the major axis direction is different from that in the minor axis direction.

The SLM in which the GH liquid crystal is provided modulates light from the read side in accordance with the change of the optical absorption coefficient due to the alignment of the dichroic dye molecules.

In the case of controlling the intensity of image light, the optical absorption coefficient depends on the kind of the dichroic dye. By adequately selecting the kind of the dichroic dye, it is possible to produce a device for emphasizing the contrast or a device for suppressing the contrast.

More specifically, in the case where a dye is used in which the absorption coefficient obtained when light passes along the major axis of the dye molecules is smaller than that obtained when light passes along the minor axis of the dye molecules (negative dichroism), the transmittance of the portion to which an electric field is applied becomes greater than that of the other portion. Therefore, the intensity of light to which the photographic paper is exposed is increased, resulting in that the contrast is emphasized.

In contrast, in the case where a dye is used in which the absorption coefficient obtained when light passes along the major axis of the dye molecules is greater than that obtained when light passes along the minor axis of the dye molecules (positive dichroism), the transmittance of the portion to which an electric field is applied becomes smaller than that of the other portion. Therefore, the intensity of light to which the photographic paper is exposed is decreased, resulting in that the contrast is suppressed.

In the SLM wherein, when an electric field is not applied to a nematic liquid crystal having a negative anisotropy of dielectric constant, liquid crystal molecules are aligned in the direction perpendicular to the substrate, and the relationship between the positiveness and negativeness of dichroism of the dye and of the emphasis and suppression of contrast is contrary to that described above. This is summarized in Table 1 below.

TABLE 1

| Dye | Liquid crystal | Anisotropy of dielectric constant | |
|---|---|---|---|
| | | Positive | Negative |
| Dichroism | Positive | Suppression of contrast | Emphasis of contrast |
| | Negative | Emphasis of contrast | Suppression of contrast |

The SLM in which the GH liquid crystal is provided may or may not includes with polarizing plates. The SLM which is not provided with polarizing plates has a drawback that the contrast of light emitted therefrom is lower than that of light emitted from the SLM wherein the TN liquid crystal is provided, but has an advantage that the optical loss in the SLM is small.

On the other hand, the surface stabilized ferroelectric liquid crystal has a configuration wherein a chiral smectic liquid crystal is provided between transparent electrodes that underwent a parallel orientation process and are respectively formed on a pair of glass substrates, so that the liquid crystal has a layer thickness of 1 to 2 $\mu$m. In a chiral smectic liquid crystal, the molecular major axes are inclined at a fixed angle to the layer. When a pulse electric field of an adequate polarity is applied to a chiral smectic liquid crystal, the molecule major axes are inverted to the direction which is symmetrical about the normal of the layer.

The SLM in which the surface stabilized ferroelectric liquid crystal is provided modulates linearly polarized light from the read side into elliptically polarized light or circularly polarized light, in accordance with the change of the inclination of the major axes of the liquid crystal molecules.

In the case of controlling the intensity of image, when light having the direction of deflection which is parallel with or perpendicular to the major axis direction of the liquid crystal molecules passes the liquid crystal, the deflection state of the light is not changed. When a pulse electric field is applied to the liquid crystal so that the major axis direction of the molecules is inverted, the light is modulated and the photographic paper is exposed to light of a desired strength, whereby the contrast of an image is controlled.

On the other hand, the polymer dispersion liquid crystal is a complex material in which polymers of the solid phase and a liquid crystal coexist while they are dispersed. There are various ratios of the amounts of these phases, and steric relationships. The scattering state of the polymer dispersion liquid crystal is changed in accordance with an electric field applied to the liquid crystal.

The SLM in which the polymer dispersion liquid crystal is provided modulates light from the read side depending on the change of the scattering state of the liquid crystal.

Accordingly, when the intensity of light entering through the write side is high so that the electric field applied to the liquid crystal is high, the degree of scattering of the liquid crystal is low, and therefore the intensity of light emitted from the SLM is high. Accordingly, also the intensity of light to which photographic paper is exposed becomes high, resulting in that the contrast of an image is emphasized.

In contrast, when the intensity of light entering through the write side is low so that the electric field applied to the liquid crystal is low, the degree of scattering of the liquid crystal is high, and therefore the intensity of light emitted from the SLM is low. Accordingly, also the intensity of light to which photographic paper is exposed becomes low, resulting in that the contrast of an image is suppressed.

DETAILED DESCRIPTION OF THE PREFERRED EMBODIMENTS

[First Embodiment]

Hereinafter, an embodiment of the invention will be described with reference to the drawings.

Figure 1:
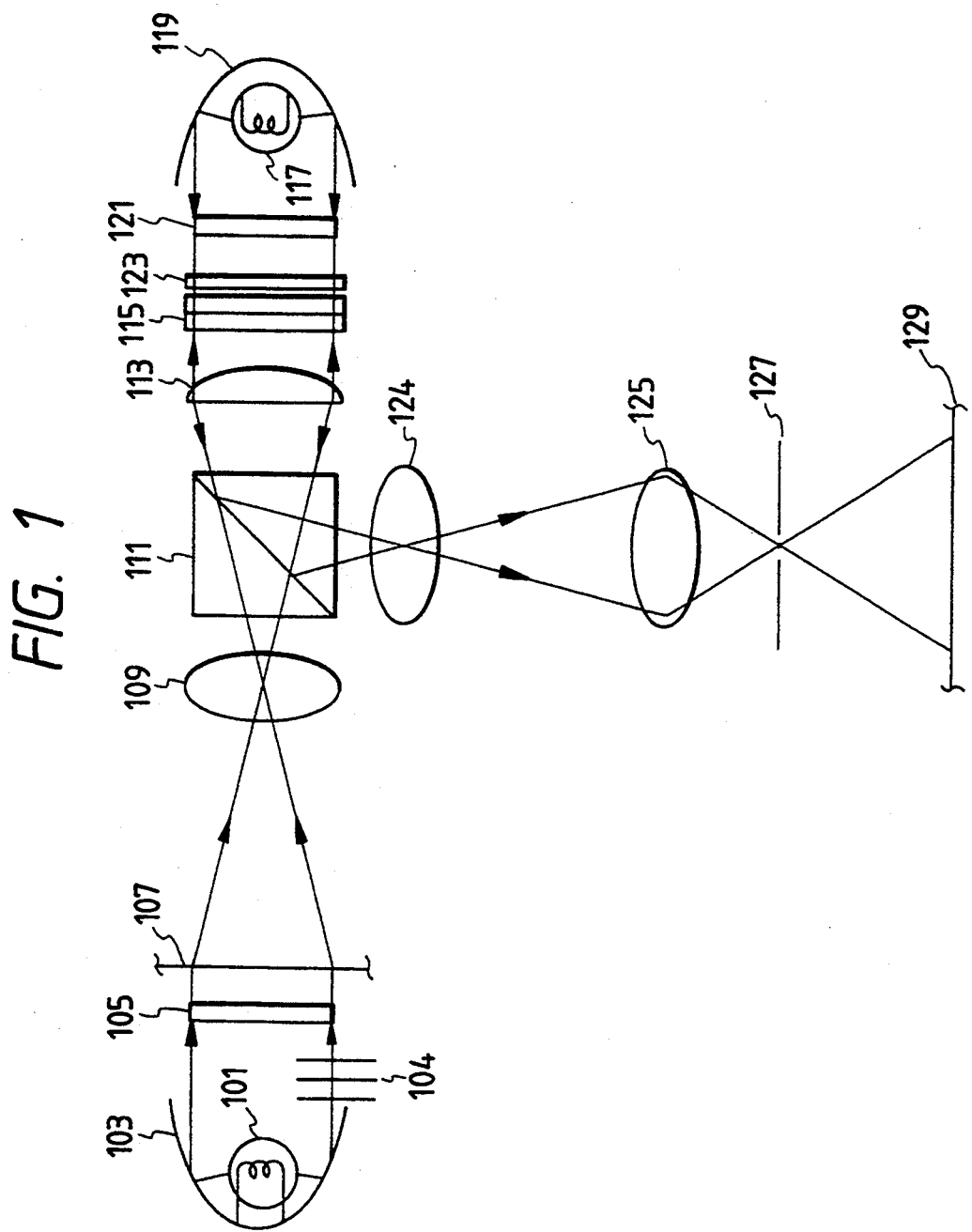
FIG. 1 is a diagram showing the configuration of an image exposure apparatus of an embodiment of the invention.

FIG. 1 shows an image exposure apparatus of the embodiment of the invention. Light from a light source 101 is reflected by a reflector 103 to proceed through color filters 104 of desired colors to a diffusion plate 105. After diffused by the diffusion plate 105, the light enters a negative film 107.

The light which has been transmitted through the negative film 107 passes through a lens 109 and a half-mirror 111, and is then converted into parallel beams by a lens 113 to enter an SLM 115.

On the other hand, light from another light source 117 is reflected by a reflector 119 and then diffused by a diffusion plate 121. Thereafter, the light enters a pattern mask 123 on which an image pattern including a frame, a graphic, characters or the like is previously formed. The light which has been transmitted through the pattern mask 123 enters the SLM 115.

Figure 2:
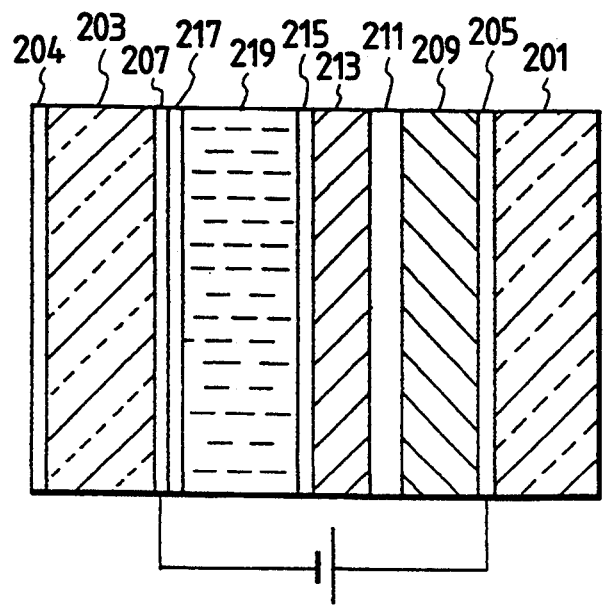
FIG. 2 is a diagram showing the configuration of an SLM used in the invention.

Hereinafter, the SLM 115 will be described with reference to FIG. 2. As shown in FIG. 2, the SLM 115 has a configuration wherein a photoconductive film 209, a light shielding film 211, a dielectric mirror 213, and a TN liquid crystal 219 in which liquid crystal molecules are aligned in a predetermined degree by orientation films 215 and 217 are arranged in this order and fixed between a pair of glass substrates 201 and 203 on which ITO (Indium Tin Oxide) transparent electrodes 205 and 207 are respectively formed so as to oppose to each other. A driving voltage is applied between the transparent electrodes 205 and 207. The glass substrate 203 is further provided with a polarizing plate 204.

Next, the operation of the SLM 115 will be described. When one light enters a write side of the SLM 115 (the side in which the glass substrate 201 is disposed), the impedance of the photoconductive film 209 is lowered according as that the intensity of the entering light increases, and the liquid crystal 219 is subjected to an electric field generated corresponding to the light intensity distribution. The liquid crystal in the portion effected by the electric field produces an electrooptic effect so that another light entering through a read side of the SLM 115 (the read side in which the glass substrate 203 is disposed) is modulated.

As shown in FIG. 1, the image light from the pattern mask 123 enters the write side of the SLM 115, and the image light from the negative film 107 enters the read side.

When the photoconductive film 209 constituting the SLM 115 is irradiated with the image light which has been transmitted through the pattern mask 123, the impedance of the irradiated area of the photoconductive film 209 is lowered, and an electric field is generated at the area of the liquid crystal 219 corresponding to the irradiated area. This causes the orientation of the liquid crystal 219 to change in accordance with the image of the pattern mask 123, so that the image light which has been transmitted through the negative film 107 is modulated by the liquid crystal 219 and then emitted from the SLM.

The light which is emitted from the read side in this way is a combination of the image of the pattern mask 123 and that of the negative film 107.

Moreover as was referred above, the intensity of the light emitted from the SLM 115 changes in response to the change of the intensity of the image light entering through the write side. Namely, light emitted from the SLM having a required intensity can be obtained by controlling the intensity of the image light entering through the write side.

The light emitted from the SLM 115 is converted into converged light by the lens 113, and then reflected by the half-mirror 111. After passing through lenses 124 and 125 and a pinhole 127, the light impinges on photographic paper 129.

Hereinafter, the image pattern which is to be combined with the image of the negative film 107 will be described with reference to FIGS. 3(a), 3(b), 3(c) and 3(d).

Figure 3A:
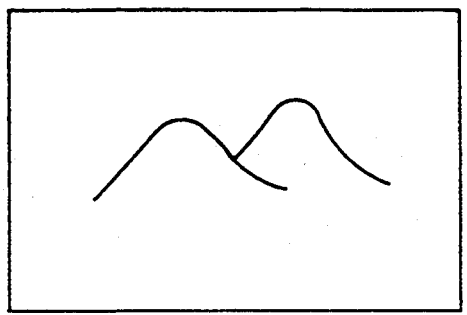
FIGS. 3(a), 3(b), 3(c) and 3(d) show image patterns of a pattern mask used in the invention.
Figure 3B:
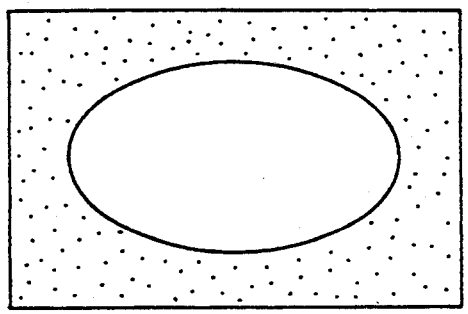

When a frame image is to be combined with the image of the negative film 107 shown in FIG. 3(a), a pattern is formed as shown in FIG. 3(b) so that the image light is allowed to enter the SLM 115 except for a frame area (dotted area in the figure) thereof to be blocked.

According to this configuration, the image light incident on the photoconductive film 209 of the SLM 115 is of restricted to an area out of the frame area. Therefore, the impedance of the portion of the photoconductive film 209 corresponding to the frame area is not lowered so that an electric field is not generated at the portion of the liquid crystal 219 corresponding to the frame area.

Figure 3C:
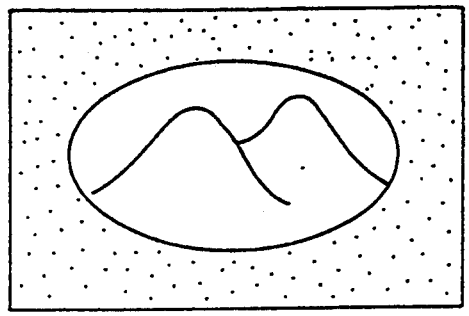

Accordingly, the portion of the liquid crystal 219 corresponding to the frame area remains to be in the scattering state. Among the image light from the negative film 107 which has entered through the read side, therefore, only the image light corresponding to the area out of the frame area is allowed to be emitted from the SLM 115. As a result, the photographic paper 129 is exposed to the image light in which the blank space frame is combined with the image of the negative film 107 as shown in FIG. 3(c).

Figure 3D:
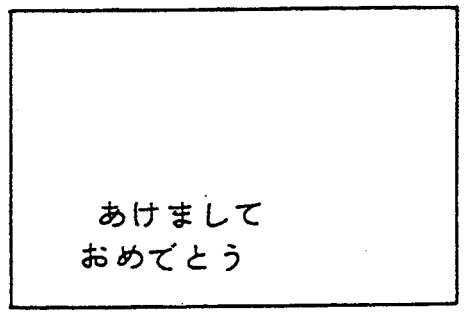

When a character image is to be combined with the image of the negative film 107, a pattern is formed as shown in FIG. 3(d) so that the write side light except for the character area to be blocked is allowed to enter the SLM 115.

According to this configuration, the image light incident on the photoconductive film 209 of the SLM 115 is of restricted to an area out of the character area. Therefore, the impedance of the portion of the photoconductive film 209 corresponding to the character area is not lowered so that an electric field is not generated at the portion of the liquid crystal 219 corresponding to the character area.

Accordingly, the portion of the liquid crystal 219 corresponding to the character area remains to be in the scattering state. Among the image light from the negative film 107 which has entered through the read side, therefore, only the image light corresponding to the area out of the character area is allowed to be emitted from the SLM 115. As a result, the photographic paper 129 is exposed to the image light in which the void character is combined with the image of the negative film 107.

On the other hand, in stead of the pattern mask 123 and the light source 117, an EL panel in which horizontal and vertical electrodes are arranged in a matrix form, or a CRT may be used. In this case, an image including a frame, a graphic, characters or the like is luminously displayed on the EL panel or the CRT. Additionally, such an image may be displayed on a liquid crystal display device.

Particularly in the case where an EL panel is used, it is possible to obtain a high definition image because an EL panel is not provided with a black matrix which is inevitably employed in a liquid crystal display device.

Another negative film may be used in place of the pattern mask 123 so that images of different negative films are combined with each other.

According to the embodiment described above, image information of a negative film and that of a pattern mask or the like are introduced into the SLM, and therefore the image information of the negative film can be modulated in such a manner that the image of the pattern mask or the like is combined with that of the negative film. This allows an image of a negative film to be easily combined with another image.

The SLM can emit image information without dividing the image information into pixels. Therefore, it is possible to expose photographic paper to a high definition image.

Moreover, the intensity of light emitted from the SLM can be changed by controlling the intensity of light incident on the write side of the SLM, thereby allowing photographic paper to be exposed to light of a desired intensity.

[Second Embodiment]

Hereinafter, second embodiment of the invention will be described with reference to the drawings.

Figure 4:
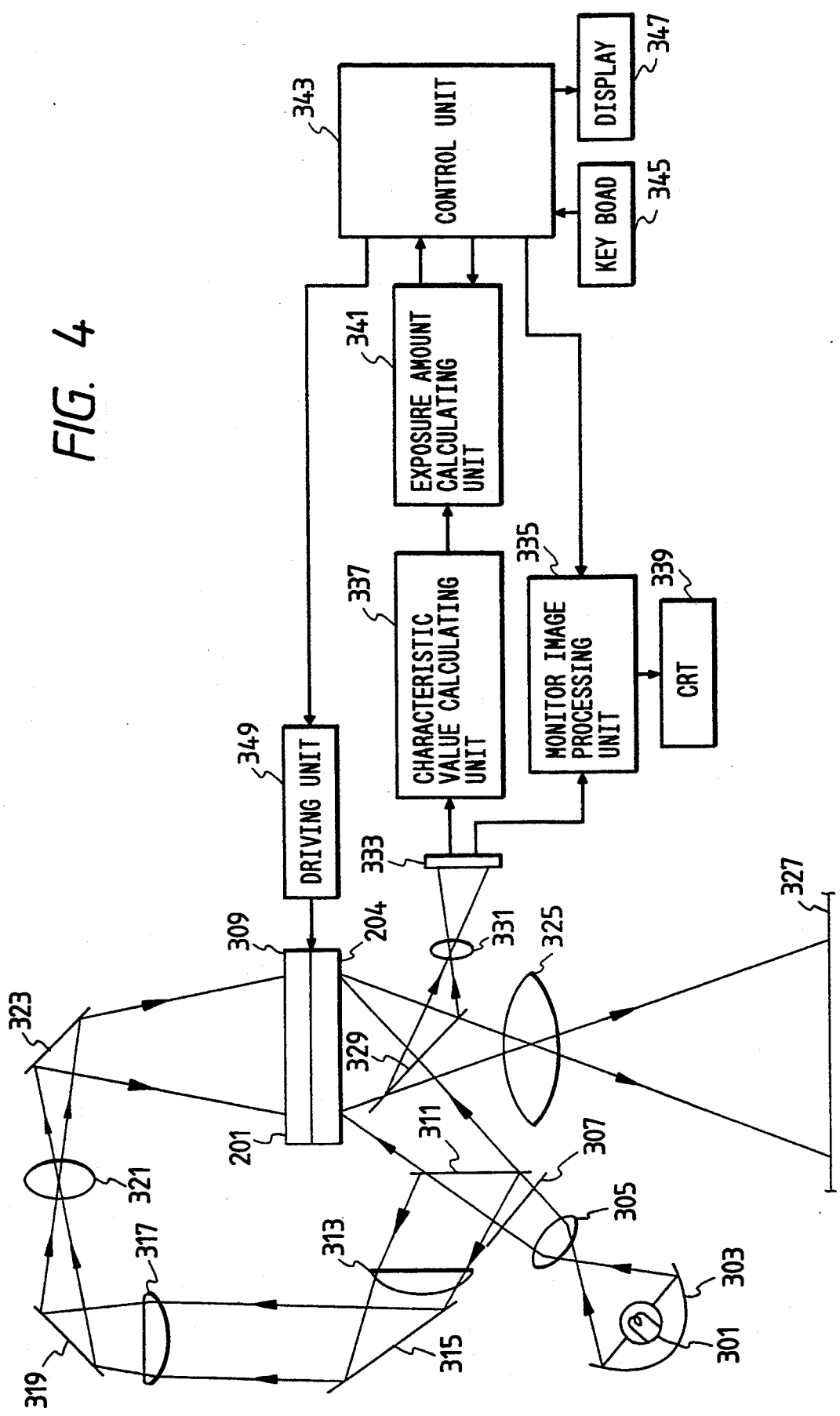
FIG. 4 is a diagram showing the configuration of an image exposure apparatus of another embodiment of the invention.

FIG. 4 shows a structural view of an image exposure apparatus of the second embodiment of the invention. Light from a light source 301 is reflected by a reflector 303 to enter a negative film 307 through a lens 305. The light which has been transmitted through the negative film 307 is split by a half-mirror 311. One of the split beams directly enters a read side of an SLM 309 (the read side in which the glass substrate 203 is disposed). Hereupon, although in FIG. 4 the incident angle to the SLM 309 is not perpendicular for convenience' sake, preferably the incident angle is near by 90°. The other split beam passes through an optical path consisting of a lens 313, a mirror 315, a lens 317, a mirror 319, a lens 321, and a mirror 323, and then enters a write side of the SLM 309 (the side in which the glass substrate 201 is disposed).

Since the SLM 309 has a similar construction to the SLM 115 described with reference to FIG. 2, similar elements are identified by same numerical references. And then a driving voltage for the transparent electrodes 205 and 207 of the SLM 309 is supplied by a driving unit 349 shown in FIG. 4.

Next, the operation of the SLM 309 of this embodiment will be described. When light enters the write side of the SLM 309, the impedance of the photoconductive film 209 is lowered according as that the intensity of the entering light is increased, and the liquid crystal 219 is effected from an electric field generated corresponding to the light intensity distribution. The liquid crystal 219 in the area to which the electric field is effected produces an electrooptic effect so that light entering through the read side is modulated.

As shown in FIG. 4, the image light from the negative film 307 enters both the write and read sides of the SLM 309.

When the photoconductive film 209 constituting the SLM 309 is irradiated with the image light which has been transmitted through the negative film 307, the impedance of the irradiated portion of the photoconductive film 209 is lowered according as that the light intensity increases, and an electric field corresponding to the light intensity distribution is generated to effect to the portion of the liquid crystal 219 corresponding to the irradiated portion. As a result, the alignment of the liquid crystal 219 to change in accordance with the brightness pattern of the image of the negative film 307, so that the image light which has been transmitted through the negative film 307 is modulated by the liquid crystal 219 and then emitted from the SLM.

The light which is emitted from the read side in this way corresponds to the brightness pattern of the image of the negative film 307, and impinges on photographic paper 327 through a lens 325.

The exposure of the image of the negative film 307 is conducted in this way. As described above, however, it is required to effectively keep the image of the negative film 307 within the density latitude of the photographic paper 327.

In the case where a portrait is taken with a bright background, for example, the brightness difference between the background and the person is large, and the density difference of the image of the negative film is therefore large. When photographic paper is exposed to such image light from the negative film, there are occasions where the image light exceeds the density latitude which can be expressed by the photographic paper. In such occasions, even if the exposure value is adjusted, available prints are only those in which the skin color of the person is uniformly obscured and the background is made white.

In the case where a portrait is taken with a dark background, the brightness difference between the background and the person is small, and therefore the density difference of the image of the negative film is small. When photographic paper is exposed to such image light of the negative film, the image obtained uses a narrow range of the density latitude which can be expressed by the photographic paper, resulting in that a print without modulation is obtained.

In the above both photographs, therefore, exposure must be conducted while correcting the contrast of the image of the negative film so that the image becomes low contrast or high contrast, or effectively using the density latitude of the photographic paper. On the contrary, depending on the intention of the photographer, there are occasions where a print having contrast which is designedly emphasized or suppressed is desired.

The intensity of light with which the photographic paper 327 is irradiated can be controlled by the SLM 309. The intensity of light emitted from the SLM 309 corresponds to the intensity distribution of the image light entering through the write side. The contrast of the image to which the photographic paper 327 is exposed can be corrected by changing the response characteristic of the SLM 309 with respect to the light intensity.

Specifically, in the liquid crystal constituting the SLM 309, the transmittance of the portion corresponding to the lower intensity portion of light entering the write side is lowered so that the intensity of the emitted light decreases. An image obtained as a result of the exposure using this emitted light has suppressed contrast. In other words, the image has low contrast.

Alternatively, in the liquid crystal constituting the SLM 309, the transmittance of the portion corresponding to the high intensity portion of light entering the write side is increased so that the intensity of the emitted light increases. An image obtained as a result of the exposure using this emitted light has emphasized contrast. In other words, the image has high contrast.

The degree of the contrast correction is determined by the characteristics of the SLM 309, for example, the characteristics of the photoconductive film and the liquid crystal, and the applied driving voltage.

Returning to FIG. 4, the contrast correction will be described.

The light emitted from the SLM 309 is split by a half-mirror 329. One of the split beams enters an image area sensor 333 through a lens 331.

The image area sensor 333 outputs an image signal to a monitor image processing unit 335, and a photometric signal which is obtained by measuring the emitted light, to a characteristic value calculating unit 337.

The monitor image processing unit 335 conducts the processes of negative/positive conversion, gradation correction, saturation correction, etc., and controls a CRT (cathode ray tube) 339 so as to display an image obtained by simulating the finished state of a print. Correction data are input though a keyboard 345 connected to a controller 343 which will be described later. The input correction data are displayed on a display device 347 connected to the controller 343.

The characteristic value calculating unit 337 calculates various characteristic values such as the density difference between a high light portion and a shadow portion of an image, and an average picture density, and outputs the calculation results to an exposure value calculating unit 341.

From the calculation results of the characteristic value calculating unit 337, and, if necessary, the correction data input through the keyboard 345, the exposure value calculating unit 341 calculates a required exposure value which is set by an exposure light intensity and an exposure time on the basis of an exposure value calculation formula, and a picture density difference. The calculation results are supplied to the controller 343.

The relationship between the picture density difference, the driving voltage, and the exposure time which is required to reproduce the image of the negative film 307 with the latitude of the photographic paper is previously stored in a memory of the controller 343. The driving voltage and the exposure time are determined on the basis of the calculation results with reference to the memory, whereby the required exposure value is determined.

The controller 343 outputs a control signal to the driving unit 349 so that the driving unit 349 applies the determined driving voltage to the SLM 309 for a predetermined time.

The SLM 309 is operated by the determined driving voltage for the determined time, thereby supplying the photographic paper with the required exposure value.

The relationship between the density difference of the image of the negative film 307 and the exposure value is determined, for example, in such a manner that, when the density difference is large, the exposure value is reduced so that the contrast of the image is suppressed, and, when the density difference is small, the exposure value is increased so that the contrast of the image is emphasized.

When contrast is to be corrected more finely, detected bright and dark positions and bright and dark regions are considered. When the brightest or darkest portion is detected in an edge area of the picture, or when the minute brightest or darkest portion is detected in the center area of the picture, for example, this brightest or darkest portion is neglected. This allows the contrast correction to be conducted in consideration of the visual characteristics.

In the embodiment described above, the image light from the negative film 307 enters the read side of the SLM 309. Alternatively, uniform light having no image information may enter the read side of the SLM, the intensity of the light may be modulated, and then the light may be emitted. In this case, when the light is passed through the SLM, the color information is eliminated. Therefore, it is necessary to write light which has undergone the three-color separation into the SLM, and read from the SLM the modulated color information with the use of light of the same color.

According to the second embodiment of the invention described above, the exposure value supplied to photographic paper is controlled in accordance with the density distribution of an image of a negative film, and an image of adequate contrast can be reproduced with effectively using the density latitude of the photographic paper.

The SLM which controls the exposure value can modulate the intensity of light entering through the read side, in accordance with the intensity of light entering through the write side, and then output the modulated light, without dividing the image information into regions. According to the invention, therefore, the light control can be conducted image-wise and it is possible to expose photographic paper to a high definition image.

Since the SLM is not required to be divided into regions which are independently driven, the calculation of the driving voltage which is supplied to the SLM can be simplified.

What is claimed is:

1. A method of exposing light sensitive material, comprising steps of:
    generating a first optical image light;
    generating a second optical image light;
    inputting said first optical image to a read side of a spatial light modulating element;
    inputting said second optical image light to a write side of said spatial light modulating element, so that said first optical image light is modulated by said second image light to be output from said read side again; and
    exposing said light sensitive material to said output image from said read side.

2. An apparatus for exposing light sensitive material, comprising:
    generating means for generating first image light;
    generating means for generating second image light;
    spatial light modulation means for receiving said first image light on a read side thereof and receiving said second image on a write side thereof, said first image being modulated with said second image to be output from said read side; and means for exposing said light sensitive material to said output image from said read side.

3. The apparatus according to claim 2, wherein said first image generating means and second image generating means have the same light source, said first and second images being split from one original image from said light source by means of a half mirror, so that said spatial light modulation means modulate intensity of said first image light entering through said read side in accordance with intensity of said second image light entering through said write side.

4. The apparatus according to claim 3, wherein said spatial light modulation means consist of a liquid crystal element of said read side, a photoconductive material of said write side, a mirror therebetween and two transparent electrodes which support a set of said liquid crystal element, photoconductive material and mirror, therebetween.

5. The apparatus according to claim 4, further comprising a driving means for supplying a predetermined voltage to said transparent electrodes to change orientation of said liquid crystal material.

6. The apparatus according to claim 5, further comprising a detecting means for detecting a density of said output image from said read side.

7. The apparatus according to claim 5, further comprising control means for controlling said driving means in accordance with said density of said output image so as to adjust a contrast range of said output image into a latitude of said light sensitive material.

* * * * *